US012311978B2

(12) United States Patent
Wu (10) Patent No.: US 12,311,978 B2
(45) Date of Patent: May 27, 2025

(54) SYSTEM FOR REALIZING AUTOMATED TRANSPORT OF GOODS AND RELATED APPARATUS (71) Applicant: Beijing Tusen Zhitu Technology Co., Ltd., Beijing (CN)

(72) Inventor: Nan Wu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 710 days.

(21) Appl. No.: 17/259,867

(22) PCT Filed: Mar. 5, 2019

(86) PCT No.: PCT/CN2019/077055
§ 371 (c)(1),
(2) Date: Jan. 12, 2021

(87) PCT Pub. No.: WO2020/010859
PCT Pub. Date: Jan. 16, 2020

(65) Prior Publication Data
US 2021/0339775 A1 Nov. 4, 2021

(30) Foreign Application Priority Data
Jul. 12, 2018 (CN) .......................... 201810765504.0

(51) Int. Cl.
B60W 60/00 (2020.01)
B60W 50/14 (2020.01)
(Continued)

(52) U.S. Cl.
CPC ...... B60W 60/00256 (2020.02); B60W 50/14 (2013.01); G06K 7/10366 (2013.01);
(Continued)

(58) Field of Classification Search
CPC .. B60W 60/00; B60W 50/00; B60W 2420/00; G06K 7/00; G06Q 10/00; G06Q 50/00; G05B 19/00
See application file for complete search history.

(56) References Cited

U.S. PATENT DOCUMENTS 8,596,951 B1    12/2013  Ward et al.
9,643,722 B1 *   5/2017  Myslinski .............. G05D 1/689
(Continued)

FOREIGN PATENT DOCUMENTS

CN       1560757 A       1/2005
CN     102519563 A       6/2012
(Continued)

OTHER PUBLICATIONS

European Patent Office, Extended European Search Report for EP 19833929.3, Mailing Date: Mar. 25, 2022, 7 pages.
(Continued)

Primary Examiner — Andrew R Dyer
Assistant Examiner — Elizabeth J Slowik
(74) Attorney, Agent, or Firm — Perkins Coie LLP (57) ABSTRACT The present disclosure provides a system for automated goods transportation and related devices, capable of achieving fully automated goods transportation within a particular area. The system includes: a management system, a loading/unloading control device, and autonomous driving control devices provided on respective autonomous vehicles. The management system is configured to manage goods information and transportation statuses of the respective autonomous vehicles, generate transportation tasks based on the goods information and the transportation statuses of the respective autonomous vehicles, and transmit each of the transportation tasks to the autonomous driving control device of the matching autonomous vehicle. The autono-
(Continued)

mous driving control device on each of the autonomous vehicles is configured to control, the autonomous vehicle to complete transportation in accordance with the transportation task. The loading/unloading control device is configured to control a loading/unloading device to automatically load goods onto or unload goods from the autonomous vehicles.

16 Claims, 1 Drawing Sheet

(51) Int. Cl.
  *G06K 7/10* (2006.01)
  *G06Q 10/0631* (2023.01)
  *G06Q 10/08* (2024.01)

(52) U.S. Cl.
  CPC ....... *G06Q 10/06315* (2013.01); *G06Q 10/08* (2013.01); *B60W 2420/403* (2013.01)

(56) References Cited

U.S. PATENT DOCUMENTS

| | | | |
|---|---|---|---|
| 9,846,415 B2* | 12/2017 | Choo | G05B 11/01 |
| 10,108,185 B1* | 10/2018 | Theobald | G05B 19/4189 |
| 10,147,059 B2* | 12/2018 | Sullivan | G06Q 10/06 |
| 2010/0021272 A1 | 1/2010 | Ward et al. | |
| 2016/0129592 A1 | 5/2016 | Saboo et al. | |
| 2016/0224930 A1* | 8/2016 | Kadaba | B65G 1/16 |
| 2016/0247247 A1* | 8/2016 | Scicluna | G06Q 50/40 |
| 2017/0084175 A1* | 3/2017 | Sedlik | H04B 1/3822 |
| 2017/0200248 A1* | 7/2017 | Murphy | B62B 3/005 |
| 2018/0194575 A1* | 7/2018 | Anderson | G06Q 10/08 |
| 2018/0218320 A1* | 8/2018 | Lee | G06K 17/0022 |
| 2019/0066041 A1* | 2/2019 | Hance | G01C 21/3407 |
| 2019/0137290 A1* | 5/2019 | Levy | B60Q 1/507 |
| 2019/0176760 A1* | 6/2019 | Uenoyama | B60R 25/305 |
| 2019/0193721 A1* | 6/2019 | Yamamuro | B60W 30/182 |
| 2019/0228375 A1* | 7/2019 | Laury | G05D 1/0088 |
| 2019/0244167 A1* | 8/2019 | Kaneko | G06Q 10/0833 |
| 2019/0324456 A1* | 10/2019 | Ryan | G06F 9/4806 |

FOREIGN PATENT DOCUMENTS

| | | |
|---|---|---|
| CN | 202838487 U | 3/2013 |
| CN | 106485340 A | 3/2017 |
| CN | 107329480 A | 11/2017 |
| CN | 107390689 A | 11/2017 |
| CN | 107403206 A | 11/2017 |
| CN | 107572264 A | 1/2018 |
| CN | 107644310 A | 1/2018 |
| CN | 107689123 A | 2/2018 |
| CN | 107807633 A | 3/2018 |
| CN | 207115198 U | 3/2018 |
| CN | 108545013 A | 9/2018 |
| DE | 10 2015 224 468 A1 | 6/2017 |
| JP | 2001060111 A | 3/2001 |
| JP | 6046290 B1 | 12/2016 |

OTHER PUBLICATIONS

European Patent Office, EP Examination Report for EP 19833929.3, Mailing Date: May 8, 2023, 9 pages.
Chinese Patent Office, First Office Action for Appl. No. 201910058337.0, mailed on Jun. 7, 2023, 25 pages, with English translation.
International Application No. PCT/CN2019/077055 International Search Report and Written Opinion Mailed May 30, 2019, pp. 1-16.
Second Chinese Office Action received for Chinese Application No. 201910058337.0 dated Nov. 20, 2023, 26 pages.
Australian Patent Office, Examination Report No. 1 for AU Appl. No. 2019302312, mailed on Mar. 6, 2024, 3 pages.
Chinese Patent Office, Third Examination Opinion Notice for Appl. No. 201910058337.0, mailed on May 18, 2024, 24 pages with English translation.
Chinese Patent Office, Rejection Decision for Appl. No. 201910058337.0, mailed on Jul. 13, 2024, 18 pages with English translation.
Australian Patent Office, Examination Report No. 2 for Appl. No. 2019302312, mailed on Jun. 27, 2024, 3 pages.
Fuchen, C. et al., "Plant Biology Experiment," Nanjing Normal University Press, Nov. 2007, 4 pages.

* cited by examiner

1

SYSTEM FOR REALIZING AUTOMATED TRANSPORT OF GOODS AND RELATED APPARATUS

The present disclosure is a National Stage of International Application No. PCT/CN2019/077055, entitled "SYSTEM FOR REALIZING AUTOMATED TRANSPORT OF GOODS AND RELATED APPARATUS" filed Mar. 5, 2019 and which claims priority to Chinese Patent Application No. 201810765504.0, titled "SYSTEM FOR AUTOMATED GOODS TRANSPORTATION AND RELATED DEVICES", filed on Jul. 12, 2018, the content of which is incorporated herein by reference in its entirety.

TECHNICAL FIELD

The present disclosure relates to autonomous driving technology, and more particularly, to a system for automated goods transportation and related devices.

BACKGROUND

Currently, in some large ports, containers are carried by trucks in a port area from ships to a yard or from the yard to the ships. The trucks in the port area are driven by truck drivers, and truck drivers cannot work continuously 24 hours a day. Therefore, at least 2-3 truck drivers are needed for a truck. However, due to the large number of trucks in the port area, a large number of truck drivers are needed, resulting in a high cost. Furthermore, there may be many vehicles and containers in the port area, and the working environment of truck drivers is dangerous. Therefore, how to achieve a fully automated goods transportation in the port area to reduce the cost has become a technical problem to be solved currently.

SUMMARY

In view of the above problem, the present disclosure provides a system for automated goods transportation and related devices, capable of achieving fully automated goods transportation within a particular area (e.g., a coastal port area, a highway port area, a mining area, a large warehouse, a goods distribution center, a campus, a logistics center, or the like).

A system for automated goods transportation is provided according to an embodiment of the present disclosure. The system includes a management system, a loading/unloading control device, and autonomous driving control devices provided on respective autonomous vehicles. The management system is configured to manage goods information and transportation statuses of the respective autonomous vehicles, generate transportation tasks based on the goods information and the transportation statuses of the respective autonomous vehicles, and transmit each of the transportation tasks to the autonomous driving control device of the matching autonomous vehicle. The autonomous driving control device on each of the autonomous vehicles is configured to control, upon receiving the transportation task, the autonomous vehicle to complete transportation in accordance with the transportation task. The loading/unloading control device is configured to control a loading/unloading device to automatically load goods onto or unload goods from the autonomous vehicles.

With the technical solutions according to the embodiments of the present disclosure, communication control among the management system, the autonomous driving control devices on the autonomous vehicles, and the loading/unloading control device is performed to allow the autonomous vehicles to transport goods in a particular area, thereby achieving fully automated goods transportation within the particular area (e.g., a coastal port area, a mining area, a highway port area, a warehouse, a goods distribution center, a campus, or the like). It does not need to have truck drivers for each truck, so as to reduce the cost.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The FIGURE is provided for facilitating further understanding of the present disclosure. The FIGURE constitutes a portion of the description and can be used in combination with the embodiments of the present disclosure to interpret, rather than limiting, the present disclosure. It is apparent to those skilled in the art that the FIGURE described below only illustrate some embodiments of the present disclosure and other figures can be obtained from the FIGURE without applying any inventive skills. In the FIGURE:

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The solutions according to the present disclosure can be applied in some particular areas such as coastal port areas, highway port areas, mining areas, goods distribution centers, warehouses, campuses, logistics centers, or the like. The present disclosure is not limited to any specific application scenario of the solutions according to the present disclosure.

In the embodiments of the present disclosure, an autonomous vehicle may refer to any vehicle having autonomous driving functions, including e.g., trucks, vans, Automated Guided Vehicles (AGVs), cranes, forklifts, tire cranes, reach stackers, etc. The present disclosure is not limited to any specific type of autonomous vehicle.

In the embodiments of the present disclosure, a loading/unloading device may be a bridge crane (i.e., a shore crane), a rail crane, a tire crane, a tower crane, a reach stacker, an overhead crane, a mobile crane, a robot, a forklift, etc. The present disclosure is not limited to any specific structure of the loading/unloading device.

Embodiment 1

Figure 1:
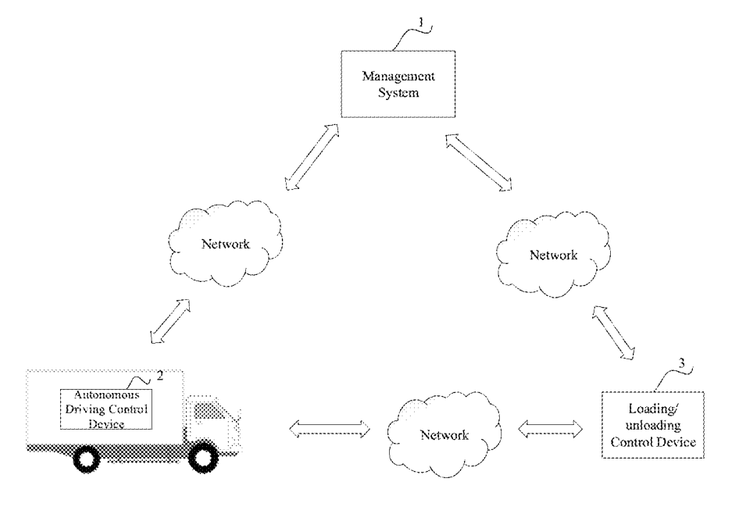
FIG. 1 is a schematic diagram showing a structure of a system for automated goods transportation according to an embodiment of the present disclosure.

Referring to FIG. 1, which is a schematic diagram showing a structure of a system for automated goods transportation according to an embodiment of the present disclosure, the system includes a management system 1, autonomous driving control devices 2 provided on respective autonomous vehicles, and a loading/unloading control device 3 for controlling one or more loading/unloading devices.

The management system 1 is configured to manage goods information and transportation statuses of the respective autonomous vehicles, generate transportation tasks based on the goods information and the transportation statuses of the respective autonomous vehicles, and transmit each of the transportation tasks to the autonomous driving control device 2 of the matching autonomous vehicle.

The autonomous driving control device 2 on each of the autonomous vehicles is configured to control, upon receiving the transportation task, the autonomous vehicle to complete transportation in accordance with the transportation task.

The loading/unloading control device 3 is configured to control a loading/unloading device to automatically load goods onto or unload goods from the autonomous vehicles.

In an embodiment of the present disclosure, the autonomous driving control device 2 may be provided on a vehicle-mounted Digital Signal Processor (DSP), Field-Programmable Gate Array (FPGA) controller, industrial computer, vehicle computer, Electronic Control Unit (ECU), or Vehicle Control Unit (VCU).

In an embodiment of the present disclosure, the loading/unloading control device 3 may be a computer server, such as a DSP, an FPGA controller, an industrial computer, a tablet computer, or a PC, etc., provided on the loading/unloading device. An operator can control the loading/unloading device to perform loading/unloading by operating the computer server. Of course, the loading/unloading control device 3 can alternatively be a remote control device capable of wireless communication, and an operator can remotely control the loading/unloading device using the remote control device. The present disclosure is not limited to any of these examples.

In an embodiment of the present disclosure, the management system 1 may be a computer server, such as a DSP, an FPGA controller, an industrial computer, a tablet computer, or a PC, etc., provided in a particular area. The present disclosure is not limited to any of these examples.

The goods information managed by the management system 1 may include basic information of all goods contained in a logistics center. The basic information may include, but not limited to, any one or more of the following information: goods type, goods ID number, goods owner, goods source, goods storage time, current storage position of goods, goods transportation destination, deadline for delivery of goods to the transportation destination, etc. In an embodiment of the present disclosure, the identity information and vehicle type (for example, container truck, van, AGV, forklift, crane, etc.) of each autonomous vehicle may be stored in the management system 1 in advance. Each autonomous vehicle can periodically synchronize the transportation status of the autonomous vehicle (the transportation status may include position information and vehicle status information (including status information such as busy status or idle status) of the autonomous vehicle) to the management system 1.

The management system 1 can generate the transportation tasks based on the goods information and the transportation statuses of the respective autonomous vehicles, and transmit each of the transportation tasks to the autonomous driving control device of the matching autonomous vehicle in the following, non-limiting scheme. For goods to be transported, a matching condition can be determined based on the goods information of the goods to be transported. From the managed autonomous vehicles, one autonomous vehicle that satisfies the matching condition can be selected as the autonomous vehicle matching the goods to be transported. The transportation task corresponding to the goods to be transported can be generated based on the goods information of the goods to be transported and the matching autonomous vehicle. The transportation task may include, but not limited to, any one or more of the following information: goods type, goods ID number, goods shipping-from-storage time, goods transportation start point, goods transportation end point, and ID information of the matching autonomous vehicle. The matching condition may be, for example, the type of vehicle being capable of transporting the goods to be transported, and the vehicle status of the autonomous vehicle being an idle status. The one autonomous vehicle that satisfies the matching condition can be selected from the managed autonomous vehicles as the autonomous vehicle matching the transportation plan as follows. A first set of autonomous vehicles each having a vehicle type capable of transporting the type of goods in the transportation plan is selected from the autonomous vehicles. A second set of autonomous vehicles each having a vehicle status of idle is selected from the first set of autonomous vehicles. If the second set of autonomous vehicles only contains one autonomous vehicle, the one autonomous vehicle can be directly determined as the autonomous vehicle matching the transportation plan. If the second set of autonomous vehicles contains more than one autonomous vehicle, an autonomous vehicle having its current position closest to the goods transportation start point in the transportation plan can be selected from the second set of autonomous vehicles, as the autonomous vehicle matching the transportation plan. If the second set of autonomous vehicles is null, an autonomous vehicle having its goods transportation end point closest to the goods transportation start point in the transportation plan can be selected from the first set of autonomous vehicles, as the autonomous vehicle matching the transportation plan.

The goods transportation start point may be the storage position of the goods to be transported. Alternatively, the goods transportation start point may be a loading position corresponding to the storage position of the goods to be transported. For example, a logistics center may contain a large number of storage yards, each corresponding to one or more loading positions. A loading position for the storage yard where the storage position of the goods to be transported is located can be determined as the goods transportation start point. In another example, a logistics center may contain a large number of warehouses, and an entrance position of each warehouse can be a loading position of the warehouse. The entrance position of the warehouse where the storage position of the goods to be transported is located can be determined as the goods transportation start point. The present disclosure is not limited to any of these examples. The goods transportation end point may be the transportation destination of the goods to be transported.

In some embodiments, in order to update the goods information and the transportation statuses of the respective autonomous vehicles in the management system 1 in time, in an embodiment of the present disclosure, the autonomous driving control device 2 can transmit a transportation task completion message to the management system 1 when the transportation task is completed. Upon receiving the transportation task completion message, the management system 1 can update the goods information and the transportation status of the corresponding autonomous vehicle based on the completed transportation task.

In some embodiments, in order to update the transportation statuses of the respective autonomous vehicles in the management system 1 in time, in an embodiment of the present disclosure, the autonomous driving control device can transmit position information of the autonomous vehicle to the management system 1 periodically. The management system 1 can update the transportation status of the corresponding autonomous vehicle based on the received position information.

In an embodiment of the present disclosure, a "loading/unloading position" may refer to a position or area for both unloading and loading. For loading at the "loading/unloading position", the "loading/unloading position" may be referred to as a "loading position", and for unloading at the "loading/unloading position", the "loading/unloading position" may be referred to as an "unloading position".

In some embodiments, when the transportation task indicates moving to a goods transportation start point for loading goods, the transportation task may contain a loading position (which may be the goods transportation start point), and the autonomous driving control device 2 can control the autonomous vehicle to complete the transportation in accordance with the transportation task by: controlling the autonomous vehicle to move from a current position to the loading position; and upon determining that the loading is completed, controlling the autonomous vehicle to leave the loading position. When the transportation task indicates carrying goods to a goods transportation end point for unloading, the transportation task may contain an unloading position (which may be the above goods transportation end point), and the autonomous driving control device 2 can control the autonomous vehicle to complete the transportation in accordance with the transportation task by: controlling the autonomous vehicle to move from a current position to the unloading position; and upon determining that the unloading is completed, controlling the autonomous vehicle to leave the unloading position.

In some embodiments, when the transportation task indicates moving to a goods transportation start point for loading goods and carrying the goods to a goods transportation end point for unloading, the transportation task may contain a loading position (which may be the above goods transportation start point) and an unloading position (which may be the above goods transportation end point), and the autonomous driving control device 2 can control the autonomous vehicle to complete the transportation in accordance with the transportation task by: controlling the autonomous vehicle to move from a current position to the loading position; controlling, upon determining that the loading is completed, the autonomous vehicle to move from the loading position to the unloading position; and controlling, upon determining that the unloading is completed, the autonomous vehicle to leave the unloading position.

In an embodiment of the present disclosure, the autonomous driving control device 2 can control the autonomous vehicle to move from the current position to the loading position in the following, non-limiting scheme. The autonomous driving control device 2 can determine a first driving route from the current position as a start point to the loading position as an end point, and control the autonomous vehicle to move from the current position to the loading position along the first driving route.

In an embodiment of the present disclosure, the autonomous driving control device 2 can determine the first driving route by planning the first driving route based on locally stored map data. Alternatively, the management system 1 can plan the first driving route based on locally stored map data and include the first driving route in the transportation task, such that the autonomous driving control device 2 can obtain the first driving route from the transportation task. Therefore, in an embodiment of the present disclosure, the autonomous driving control device 2 can determine the driving route from the current position as the start point to the loading position as the end point in any of the following, non-limiting schemes (Schemes A1~A2).

Scheme A1: The autonomous driving control device 2 can plan the first driving route from the current position as the start point to the loading position as the end point based on pre-stored map data.

In Scheme A1, the autonomous driving control device 2 can plan the driving route using its own navigation software, or the autonomous driving control device 2 can plan the first driving route using third-party map software.

Scheme A2: The autonomous driving control device 2 can obtain from the transportation task the first driving route from the current position to the loading position.

In Scheme A2, the first driving route is composed of path points constituting the first driving route, and the autonomous driving control device 2 can sequentially display the path points in the transportation task on a local map, and use the first driving route displayed on the map as a navigation route to control the vehicle to move from the current position to the loading position.

In the embodiment of the present disclosure, the autonomous driving control device 2 can control the autonomous vehicle to move from the loading position to the unloading position in the following, non-limiting scheme. The autonomous driving control device 2 can determine a second driving route from the loading position as a start point to the unloading position as an end point, and control the autonomous vehicle to move from the loading position to the unloading position along the second driving route. The autonomous driving control device 2 can determine the second driving route from the loading position as the start point to the unloading position as the end point according to similar principles to the above Schemes A1~A2, and details thereof will be omitted here.

In some embodiments, the autonomous driving control device 2 can determine that the loading is completed in any of the following, non-limiting schemes (Schemes B1~B5).

Scheme B1: It can be determined that the loading is completed when an instruction indicating completion of the loading onto the autonomous vehicle is received from the loading/unloading control device 3.

In Scheme B1, correspondingly, when the loading/unloading control device 3 determines that the loading/unloading device has completed the loading onto the autonomous vehicle, it can transmit an instruction indicating completion of the loading onto the autonomous vehicle to the autonomous driving control device 2 of the autonomous vehicle. In Scheme B1, the autonomous driving control device 2 and the loading/unloading control device 3 can communicate with each other.

Scheme B2: It can be determined that the loading is completed when an instruction indicating completion of the loading onto the autonomous vehicle is received from the management system 1.

In Scheme B2, correspondingly, when the management system 1 determines that the loading/unloading device has completed the loading onto the autonomous vehicle, it can transmit an instruction indicating completion of the loading onto the autonomous vehicle to the autonomous driving control device 2 of the autonomous vehicle. The management system 1 can determine that the loading/unloading device has completed the loading onto the autonomous vehicle in the following, non-limiting scheme. The management system 1 can receive from the loading/unloading control device 3 an instruction indicating completion of the loading onto the autonomous vehicle, so as to determine that the loading onto the autonomous vehicle is completed.

Scheme B3: It can be determined that the loading is completed when determining that a gravity value outputted from a gravity sensor mounted on the autonomous vehicle is greater than or equal to a predetermined gravity threshold and the gravity value has not changed for a predetermined time period.

In Scheme B3, a gravity sensor may be provided on a platform of the autonomous vehicle, and it can be determined whether the loading is completed by monitoring the change of the gravity value outputted from the gravity sensor.

Scheme B4: It can be determined that the loading is completed when a notification message indicating completion of the loading onto the autonomous vehicle is obtained by identifying, using an predetermined image identification algorithm, content in an image of an electronic screen located near the loading position as captured by a vehicle mounted camera provided on the autonomous vehicle.

In Scheme B4, an electronic screen can be provided near each loading position. When the loading onto the autonomous vehicle stopping at the loading position is completed, a notification message indicating completion of the loading onto the autonomous vehicle can be displayed on the electronic screen. For example, information such as "License Plate Number *****, Loading Completed" or "Loading Completed" can be displayed on the electronic screen.

Scheme B5: It can be determined that the loading is completed when a notification message indicating completion of the loading onto the autonomous vehicle as broadcasted by a voice broadcaster is identified using a predetermined voice model.

In Scheme B5, a voice broadcaster can be provided near the loading position. When the loading onto the autonomous vehicle stopping at the loading position is completed, the voice broadcaster can broadcast a notification message indicating completion of the loading onto the autonomous vehicle. For example, the broadcasted voice information may be "License Plate Number *****, Loading Completed" or "Loading Completed".

In some embodiments, the autonomous driving control device 2 can determine that the unloading is completed in any of the following, non-limiting schemes (Schemes C1~C5).

Scheme C1: It can be determined that the unloading is completed when an instruction indicating completion of the unloading from the autonomous vehicle is received from the loading/unloading control device 3.

In Scheme C1, correspondingly, when the loading/unloading control device 3 determines that the loading/unloading device has completed the unloading from the autonomous vehicle, it can transmit an instruction indicating completion of the unloading from the autonomous vehicle to the autonomous driving control device 2 of the autonomous vehicle.

Scheme C2: It can be determined that the unloading is completed when an instruction indicating completion of the unloading from the autonomous vehicle is received from the management system 1.

In Scheme C2, correspondingly, when the management system 1 determines that the loading/unloading device has completed the unloading from the autonomous vehicle, it can transmit an instruction indicating completion of the unloading from the autonomous vehicle to the autonomous driving control device 2 of the autonomous vehicle. The management system 1 can determine that the loading/unloading device has completed the unloading from the autonomous vehicle in the following, non-limiting scheme. The management system 1 can receive from the loading/unloading control device 3 an instruction indicating completion of the unloading from the autonomous vehicle to determine that the unloading from the autonomous vehicle is completed.

Scheme C3: It can be determined that the unloading is completed when determining that a gravity value outputted from a gravity sensor mounted on the autonomous vehicle is smaller than or equal to a predetermined gravity threshold and the gravity value has not changed for a predetermined time period.

In Scheme C3, a gravity sensor may be provided on a platform of the autonomous vehicle, and it can be determined whether the unloading is completed by monitoring the change of the gravity value outputted from the gravity sensor.

Scheme C4: It can be determined that the unloading is completed when a notification message indicating completion of the unloading from the autonomous vehicle is obtained by identifying, using an predetermined image identification algorithm, content in an image of an electronic screen located near the unloading position as captured by a vehicle mounted camera provided on the autonomous vehicle.

In Scheme C4, an electronic screen can be provided near each unloading position.

When the unloading from the autonomous vehicle stopping at the unloading position is completed, a notification message indicating completion of the unloading from the autonomous vehicle can be displayed on the electronic screen. For example, information such as "License Plate Number *****, Unloading Completed" or "Unloading Completed" can be displayed on the electronic screen.

Scheme C5: It can be determined that the unloading is completed when a notification message indicating completion of the unloading from the autonomous vehicle as broadcasted by a voice broadcaster is identified using a predetermined voice model.

In Scheme C5, a voice broadcaster can be provided near the unloading position. When the unloading from the autonomous vehicle stopping at the unloading position is completed, the voice broadcaster can broadcast a notification message indicating completion of the unloading from the autonomous vehicle. For example, the broadcasted voice information may be "License Plate Number *****, Unloading Completed" or "Unloading Completed".

In some embodiments of the present disclosure, each loading/unloading device corresponds to at least one loading/unloading position, and the autonomous vehicle moves to the loading/unloading position corresponding to the loading/unloading device to wait for the loading/unloading device to load/unload goods. Accordingly, the loading/unloading device loads goods onto or unloads goods from the autonomous vehicle stopping at the loading/unloading position corresponding to the loading/unloading device. The loading/unloading control device 3 can control the loading/unloading device to automatically load goods onto or unload goods from the autonomous vehicle in any of the following, non-limiting schemes (Schemes D1~D3).

Scheme D1: the loading/unloading control device 3 can receive a loading/unloading instruction from the autonomous driving control device 2 of the autonomous vehicle stopping at the loading/unloading position corresponding to the loading/unloading device, and control the loading/unloading device to load goods onto or unload goods from the autonomous vehicle in accordance with the loading/unloading instruction.

In Scheme D1, correspondingly, when the autonomous vehicle stops at the loading/unloading position corresponding to the loading/unloading device, the autonomous driving control device 2 can transmit a loading/unloading instruction to the loading/unloading control device corresponding to the loading/unloading device. For example, when the autonomous vehicle arrives at a loading position in the transportation task, a loading instruction can be transmitted to the loading/unloading control device 3. When the autonomous vehicle arrives at an unloading position in the transportation task, an unloading instruction can be transmitted to the loading/unloading control device 3.

Scheme D2: The loading/unloading control device 3 can receive from the management system 1 a loading/unloading instruction to load goods onto or unload goods from the autonomous vehicle stopping at the loading/unloading position corresponding to the loading/unloading device, and control the loading/unloading device to load goods onto or unload goods from the autonomous vehicle in accordance with the loading/unloading instruction.

In Scheme D2, correspondingly, when the management system 1 determines from position information transmitted from the autonomous vehicle that the autonomous vehicle has arrived at the loading position/unloading position in the transportation task, it can transmit a corresponding loading/unloading instruction to the loading/unloading control device 3. Alternatively, when the management system 1 receives a ready-for-loading message or a ready-for-unloading message from the autonomous driving control device 2, it can transmit a corresponding loading/unloading instruction to the loading/unloading control device 3.

Scheme D3: The loading/unloading control device can obtain a vehicle ID number of the autonomous vehicle stopping at the loading/unloading position corresponding to the loading/unloading device, determine a loading/unloading instruction corresponding to the autonomous vehicle from a predetermined correspondence between vehicle ID numbers and loading/unloading instructions, and control the loading/unloading device to load goods onto or unload goods from the autonomous vehicle in accordance with the loading/unloading instruction.

In Scheme D3, the correspondence between vehicle ID numbers and loading/unloading instructions may be stored in the loading/unloading control device 3 in advance.

In Scheme D3, the loading/unloading control device can obtain the vehicle ID number of the autonomous vehicle stopping at the loading/unloading position corresponding to the loading/unloading device in any of the following, non-limiting schemes (Schemes E1~E2).

Scheme E1: A picture on the autonomous vehicle can be captured using a camera provided on the loading/unloading device, and the vehicle ID number can be identified from the picture using an image identification technology. The picture contains the vehicle ID number of the autonomous vehicle.

In Scheme E1, the picture may be a picture containing the vehicle ID number in a text form, or the picture may be a two-dimensional code or a barcode containing the vehicle ID number.

Scheme E2: an electronic tag provided on the autonomous vehicle can be read using an inductive reader provided on the loading/unloading device to obtain the vehicle ID number of the autonomous vehicle. The electronic tag contains the vehicle ID number of the autonomous vehicle.

The vehicle ID number may be information by which the autonomous vehicle can be uniquely identified. For example, it may be a license plate number of the autonomous vehicle, or it may be a serial number preset for the autonomous vehicle.

In some embodiments of the present disclosure, the loading/unloading control device 3 can control the loading/unloading device to load goods onto or unload goods from the autonomous vehicle in accordance with the loading/unloading instruction in the following, non-limiting scheme.

When the loading/unloading instruction is a loading instruction, a goods ID number and a storage position of the goods to be loaded corresponding to the autonomous vehicle can be determined, and the loading/unloading device can be controlled to obtain the goods to be loaded corresponding to the goods ID number from the storage position and to load the goods to be loaded onto the autonomous vehicle.

When the loading/unloading instruction is an unloading instruction, a target storage position corresponding to the goods to be unloaded from the autonomous vehicle can be determined, and the loading/unloading device can be controlled to unload the goods to be unloaded from the autonomous vehicle to the target storage position.

In an example, the loading instruction may include the goods ID number of the goods to be loaded, and the loading/unloading control device can determine the goods ID number of the goods to be loaded corresponding to the autonomous vehicle by: obtaining the goods ID number of the goods to be loaded corresponding to the autonomous vehicle from the loading instruction.

In an example, the loading instruction may include a vehicle ID number of the autonomous vehicle, and the correspondence between goods ID numbers of the goods to be loaded and vehicle ID numbers of the respective autonomous vehicles can be stored in advance in the loading/unloading control device. The loading/unloading control device can determine the goods ID number of the goods to be loaded corresponding to the autonomous vehicle by: determining from the correspondence the goods ID number of the goods to be loaded corresponding to the vehicle ID number of the autonomous vehicle in the loading instruction.

In an embodiment of the present disclosure, the autonomous driving control device 2 and the management system 1 can be connected by means of wireless communication. For example, they can communicate with each other using conventional wireless communication schemes such as Bluetooth, Local Area Network (LAN), infrared or the like. Alternatively, the autonomous driving control device 2 can be provided with a Vehicle-to-Everything (V2X) device and the management system 1 can be provided with a V2X device, such that the autonomous driving control device 2 and the management system 1 can communicate with each other using the V2X communication technology.

The loading/unloading control device 3 and the management system 1 can be connected by means of wireless communication. For example, they can communicate with each other using conventional wireless communication schemes such as Bluetooth, LAN, infrared or the like. Alternatively, the management system 1 can be provided with a V2X device and the loading/unloading control device 3 can be provided with a V2X device, such that the loading/unloading control device 3 and the management system 1 can communicate with each other using the V2X communication technology.

The loading/unloading control device 3 and the autonomous driving control device 2 can be connected by means of wireless communication. For example, they can communicate with each other using conventional wireless communication schemes such as Bluetooth, LAN, infrared or the like. Alternatively, the loading/unloading control device 3 can be provided with a V2X device and the autonomous driving control device 2 can be provided with a V2X device, such that the loading/unloading control device 3 and the autonomous driving control device 2 can communicate with each other using the V2X communication technology.

In the above embodiment, the management system 1 may include a first communication unit, a management unit, and a transportation task distribution unit.

The first communication unit is configured to transmit and receive information.

The management unit is configured to manage the goods information and the transportation statuses of the respective autonomous vehicles.

The transportation task distribution unit is configured to generate the transportation tasks based on the goods information and the transportation statuses of the respective autonomous vehicles, and transmit each of the transportation tasks to the autonomous driving control device of the matching autonomous vehicle.

The transportation task distribution unit can generate the transportation tasks based on the goods information and the transportation statuses of the respective autonomous vehicles, and transmit each of the transportation tasks to the autonomous driving control device of the matching autonomous vehicle in the following, non-limiting scheme. For goods to be transported, a matching condition can be determined based on the goods information of the goods to be transported. From the managed autonomous vehicles, one autonomous vehicle that satisfies the matching condition can be selected as the autonomous vehicle matching the goods to be transported. The transportation task corresponding to the goods to be transported can be generated based on the goods information of the goods to be transported and the matching autonomous vehicle. For further details, reference can be made to the above related content, and description thereof will be omitted here.

In order to update the goods information and the transportation statuses of the respective autonomous vehicles in the management unit in time, in an embodiment of the present disclosure, the management unit can be configured to, upon receiving a transportation task completion message via the first communication unit, update the goods information and the transportation status of the corresponding autonomous vehicle based on the completed transportation task.

In order to update the transportation statuses of the respective autonomous vehicles in the management unit in time, in an embodiment of the present disclosure, the management unit can be configured to, upon receiving position information of the autonomous vehicle via the first communication unit, update the transportation status of the corresponding autonomous vehicle.

In the above embodiment, the autonomous driving control device 2 may include a second communication unit and a first control unit.

The second communication unit is configured to transmit and receive information.

The first control unit is configured to control the autonomous vehicle to complete the transportation in accordance with the transportation task, upon receiving the transportation task via the second communication unit.

In some embodiments, when the transportation task indicates moving to a goods transportation start point for loading goods, the transportation task may contain a loading position (which may be the goods transportation start point), and the first control unit can control the autonomous vehicle to complete the transportation in accordance with the transportation task by: controlling the autonomous vehicle to move from a current position to the loading position; and upon determining that the loading is completed, controlling the autonomous vehicle to leave the loading position. When the transportation task indicates carrying goods to a goods transportation end point for unloading, the transportation task may contain an unloading position (which may be the above goods transportation end point), and the first control unit can control the autonomous vehicle to complete the transportation in accordance with the transportation task by: controlling the autonomous vehicle to move from a current position to the unloading position; and upon determining that the unloading is completed, controlling the autonomous vehicle to leave the unloading position.

In some embodiments, when the transportation task indicates moving to a goods transportation start point for loading goods and carrying the goods to a goods transportation end point for unloading, the transportation task may contain a loading position (which may be the above goods transportation start point) and an unloading position (which may be the above goods transportation end point), and the first control unit can control the autonomous vehicle to complete the transportation in accordance with the transportation task by: controlling the autonomous vehicle to move from a current position to the loading position; controlling, upon determining that the loading is completed, the autonomous vehicle to move from the loading position to the unloading position; and controlling, upon determining that the unloading is completed, the autonomous vehicle to leave the unloading position.

In an embodiment of the present disclosure, the first control unit can be further configured to transmit a transportation task completion message to the vehicle management system via the second communication unit when it is determined that the transportation task is completed.

In the above embodiment, the loading/unloading control device 3 may include a third communication unit and a second control unit.

The third communication unit is configured to transmit and receive information.

The second control unit is configured to control the loading/unloading device to automatically load goods onto or unload goods from the autonomous vehicle.

Each loading/unloading device may correspond to at least one loading/unloading position, and the second control unit can control the loading/unloading device to automatically load goods onto or unload goods from the autonomous vehicle in any of the above non-limiting Schemes D1 to D3 (details thereof will be omitted here).

The basic principles of the present disclosure have been described above with reference to the embodiments. However, it can be appreciated by those skilled in the art that all or any of the steps or components of the method or device according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A system for automated goods transportation, comprising a management system, a loading/unloading control device, and an autonomous driving control device provided on an autonomous vehicle, wherein:

the management system is configured to manage goods information and transportation status of the autonomous vehicle, generate a transportation task at least based on the goods information and the transportation status of the autonomous vehicle, and transmit the transportation task to the autonomous driving control device of the autonomous vehicle, the autonomous driving control device on the autonomous vehicle is configured to control, upon receiving the transportation task, the autonomous vehicle to complete transportation in accordance with the transportation task, and the loading/unloading control device is configured to control a loading/unloading device to load goods onto or unload goods from the autonomous vehicle, wherein the transportation task contains a loading position, and the autonomous driving control device being configured to control the autonomous vehicle to complete the transportation in accordance with the transportation task comprises the autonomous driving control device being configured to:

control the autonomous vehicle to move from a current position to the loading position; and control, upon determining that the loading is completed, the autonomous vehicle to leave the loading position, wherein the autonomous driving control device is configured to determine that the loading is completed upon identifying, using a predetermined voice model, a notification message indicating a vehicle identification (ID) number of the autonomous vehicle and completion of the loading onto the autonomous vehicle as broadcasted by a voice broadcaster, wherein the management system is configured to select the autonomous vehicle by:

determining, for goods to be transported, a matching condition indicating a vehicle type, based on the goods information of the goods to be transported comprising a goods type;

determining a first set of autonomous vehicles each having the vehicle type indicated by the matching condition, selecting, from the first set of autonomous vehicles, a second set of autonomous vehicles each having a vehicle status being idle, in response to the second set of autonomous vehicles including more than one autonomous vehicle, selecting, from the second set of autonomous vehicles, the autonomous vehicle that is closest to a transportation start point of the goods to be transported, and in response to the second set of autonomous vehicles being null, selecting, from the first set of autonomous vehicles, the autonomous vehicle having goods transportation end point closest to the transportation start point of the goods to be transported, wherein identifying, using the predetermined voice model, the notification message comprises:

identifying, using the predetermined voice model, the vehicle ID number of the autonomous vehicle.

2. The system of claim 1, wherein the transportation task further contains an unloading position, and the autonomous driving control device being configured to control the autonomous vehicle to complete the transportation in accordance with the transportation task comprises the autonomous driving control device being configured to:

control the autonomous vehicle to move to the unloading position; and control, upon determining that the unloading is completed, the autonomous vehicle to leave the unloading position.

3. The system of claim 2, wherein the autonomous driving control device is configured to determine that the unloading is completed when:

an instruction indicating completion of the unloading from the autonomous vehicle is received from the loading/unloading control device, or an instruction indicating completion of the unloading from the autonomous vehicle is received from the management system.

4. The system of claim 2, wherein the autonomous driving control device determines that the unloading is completed when:

a notification message indicating completion of the unloading from the autonomous vehicle as broadcasted by a voice broadcaster is identified using a predetermined voice model.

5. The system of claim 1, wherein the transportation task further contains an unloading position, and the autonomous driving control device being configured to control the autonomous vehicle to complete the transportation in accordance with the transportation task comprises the autonomous driving control device being configured to:

control, upon determining that the loading is completed, the autonomous vehicle to move from the loading position to the unloading position; and control, upon determining that the unloading is completed, the autonomous vehicle to leave the unloading position.

6. The system of claim 1, wherein the autonomous driving control device is configured to determine that the loading is completed when:

it is determined that a gravity value outputted from a gravity sensor mounted on the autonomous vehicle is greater than or equal to a predetermined gravity threshold and the gravity value has not changed for a predetermined time period.

7. The system of claim 1, wherein the loading/unloading control device being configured to control the loading/unloading device to load goods onto or unload goods from the autonomous vehicle comprises the loading/unloading control device being configured to:

receive a loading/unloading instruction from the autonomous driving control device of the autonomous vehicle corresponding to the loading/unloading device, and control the loading/unloading device to load goods onto or unload goods from the autonomous vehicle in accordance with the loading/unloading instruction.

8. The system of claim 7, wherein the loading/unloading control device being configured to control the loading/unloading device to load goods onto or unload goods from the autonomous vehicle in accordance with the loading/unloading instruction comprises the loading/unloading control device being configured to:

determine, when the loading/unloading instruction is an unloading instruction, a target storage position corresponding to the goods to be unloaded from the autonomous vehicle, and control the loading/unloading device to unload the goods to be unloaded from the autonomous vehicle to the target storage position.

9. The system of claim 1, wherein the autonomous driving control device is further configured to transmit a transportation task completion message to the management system when determining that the transportation task is completed, and the management system is further configured to update, upon receiving the transportation task completion message, the goods information and the transportation status of the autonomous vehicle based on the completed transportation task.

10. The system of claim 1, wherein the loading/unloading control device being configured to control the loading/unloading device to load goods onto or unload goods from the autonomous vehicle comprises the loading/unloading control device being configured to:

obtain the vehicle ID number of the autonomous vehicle which comprises a license plate number or a serial number preset for the autonomous vehicle and corresponds to the loading/unloading device, determine a loading/unloading instruction corresponding to the autonomous vehicle from a predetermined correspondence between vehicle ID numbers and loading/unloading instructions, and control the loading/unloading device to load goods onto or unload goods from the autonomous vehicle in accordance with the loading/unloading instruction.

11. The system of claim 10, wherein the loading/unloading control device being configured to obtain the vehicle ID number of the autonomous vehicle corresponding to the loading/unloading device comprises the loading/unloading control device being configured to:

capture a picture of the autonomous vehicle using a camera provided on the loading/unloading device, and identify the vehicle ID number from the picture using an image identification technology, the picture containing the vehicle ID number of the autonomous vehicle.

12. A method for automated goods transportation, comprising:

generating, by a management system, a transportation task based on goods information and transportation status of an autonomous vehicle, transmitting, by the management system, the transportation task to an autonomous driving control device of the autonomous vehicle, controlling, by the autonomous driving control device upon receiving the transportation task, the autonomous vehicle to complete transportation in accordance with the transportation task, and controlling, by a loading/unloading control device, a loading/unloading device to load goods onto or unload goods from the autonomous vehicle, wherein the transportation task contains a loading position, and wherein controlling, by the autonomous driving control device upon receiving the transportation task, the autonomous vehicle to complete transportation in accordance with the transportation task comprises:
controlling, by the autonomous driving control device, the autonomous vehicle to move from a current position to the loading position; and
controlling, by the autonomous driving control device upon determining that the loading is completed, the autonomous vehicle to leave the loading position,
wherein determining that the loading is completed comprises: identifying, by the autonomous driving control device using a predetermined voice model, a notification message indicating a vehicle identification (ID) number of the autonomous vehicle and completion of the loading onto the autonomous vehicle as broadcasted by a voice broadcaster,
wherein the method further comprises selecting, by the management system, the autonomous vehicle by:
determining, for goods to be transported, a matching condition indicating a vehicle type, based on the goods information of the goods to be transported comprising a goods type;
determining a first set of autonomous vehicles each having the vehicle type indicated by the matching condition,
selecting, from the first set of autonomous vehicles, a second set of autonomous vehicles each having a vehicle status being idle,
in response to the second set of autonomous vehicles including more than one autonomous vehicle, selecting, from the second set of autonomous vehicles, the autonomous vehicle that is closest to a transportation start point of the goods to be transported, and
in response to the second set of autonomous vehicles being null, selecting, from the first set of autonomous vehicles, the autonomous vehicle having goods transportation end point closest to the transportation start point of the goods to be transported,
wherein identifying, by the autonomous driving control device using the predetermined voice model, the notification message comprises:
identifying, by the autonomous driving control device using the predetermined voice model, the vehicle ID number of the autonomous vehicle.

13. The method of claim 12, wherein determining that the loading is completed comprises:
determining, by the autonomous driving control device, that a gravity value outputted from a gravity sensor mounted on the autonomous vehicle is greater than or equal to a predetermined gravity threshold and the gravity value has not changed for a predetermined time period.

14. The method of claim 12, wherein controlling, by the loading/unloading control device, the loading/unloading device to load goods onto or unload goods from the autonomous vehicle comprises:
obtaining, by the loading/unloading control device, the vehicle ID number of the autonomous vehicle which comprises a license plate number or a serial number preset for the autonomous vehicle and corresponds to the loading/unloading device, determining a loading/unloading instruction corresponding to the autonomous vehicle from a predetermined correspondence between vehicle ID numbers and loading/unloading instructions, and controlling the loading/unloading device to load goods onto or unload goods from the autonomous vehicle in accordance with the loading/unloading instruction.

15. The method of claim 14, wherein controlling the loading/unloading device to load goods onto or unload goods from the autonomous vehicle in accordance with the loading/unloading instruction comprises:
determining, when the loading/unloading instruction is a loading instruction, a goods ID number and a storage position of the goods to be loaded corresponding to the autonomous vehicle, and controlling the loading/unloading device to obtain the goods to be loaded corresponding to the goods ID number from the storage position and to load the goods to be loaded onto the autonomous vehicle, or
determining, when the loading/unloading instruction is an unloading instruction, a target storage position corresponding to the goods to be unloaded from the autonomous vehicle, and controlling the loading/unloading device to unload the goods to be unloaded from the autonomous vehicle to the target storage position.

16. The method of claim 14, wherein obtaining, by the loading/unloading control device, the ID number of the autonomous vehicle corresponding to the loading/unloading device comprises: capturing a picture on the autonomous vehicle using a camera provided on the loading/unloading device, and identifying the vehicle ID number from the picture using an image identification technology, the picture containing the vehicle ID number of the autonomous vehicle, or
reading an electronic tag provided on the autonomous vehicle using an inductive reader provided on the loading/unloading device to obtain the vehicle ID number of the autonomous vehicle, the electronic tag containing the vehicle ID number of the autonomous vehicle.

* * * * *